United States Patent [19]

Sattlegger et al.

[11] 4,419,484
[45] Dec. 6, 1983

[54] ORGANOPOLYSILOXANE MOLDING COMPOSITIONS

[75] Inventors: Hans Sattlegger, Odenthal; Karl Schnurrbusch; Theo Achtenberg, both of Leverkusen, all of Fed. Rep. of Germany

[73] Assignee: Bayer Aktiengesellschaft, Leverkusen, Fed. Rep. of Germany

[21] Appl. No.: 341,929

[22] Filed: Jan. 22, 1982

[30] Foreign Application Priority Data

Feb. 10, 1981 [DE] Fed. Rep. of Germany ....... 3104645

[51] Int. Cl.$^3$ ............................................. C08K 5/54
[52] U.S. Cl. ................................. 524/731; 524/267; 524/730; 528/33; 528/34; 528/901
[58] Field of Search ...................... 524/267, 730, 731; 528/901, 33, 34

[56] References Cited

U.S. PATENT DOCUMENTS

| | | | |
|---|---|---|---|
| 3,004,859 | 10/1961 | Lichtenwalner | 106/308 Q |
| 3,628,996 | 12/1971 | Weber | 427/387 |
| 3,642,692 | 2/1972 | Hartlage | 528/34 |
| 3,701,753 | 10/1972 | Shaw | 528/33 |
| 3,919,136 | 11/1975 | Smith | 524/730 |
| 3,986,999 | 10/1976 | Sattlegger et al. | 523/122 |
| 4,124,560 | 11/1978 | Herzig | 528/34 |
| 4,131,589 | 12/1978 | Smith, Jr. | 528/901 |

FOREIGN PATENT DOCUMENTS

| | | |
|---|---|---|
| 2117026 | 10/1971 | Fed. Rep. of Germany . |
| 2237551 | 2/1973 | Fed. Rep. of Germany . |
| 340684 | 12/1977 | Fed. Rep. of Germany . |
| 1377383 | 12/1974 | United Kingdom . |

Primary Examiner—Melvyn I. Marquis
Attorney, Agent, or Firm—Sprung, Horn, Kramer & Woods

[57] ABSTRACT

The present invention relates organopolysiloxane molding compositions which are capable of storage in the absence of moisture and which crosslink to give elastomers after the admission of water or steam, and are based on α,ω-dihydroxyorganopolysiloxanes and substances which produce crosslinking, a short-chain siloxane of the general formula

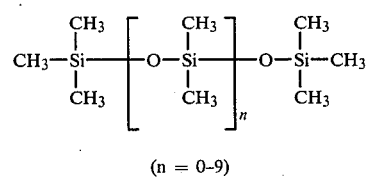

(n = 0-9)

being added, in addition to customary additives.

4 Claims, No Drawings

ORGANOPOLYSILOXANE MOLDING COMPOSITIONS

The present invention relates to organopolysiloxane molding compositions which are improved, particularly with respect to their adhesion to the most diverse substrates.

Pastes which are ready-to-use and which are based on organopolysiloxane have an extensive area of application as joint-sealing materials. Pastes of this type and the elastomer moldings obtained therefrom by cross-linking, with the up-take of atmospheric moisture, represent an ideal sealant for the most diverse purposes. Classical representatives of so-called one-component systems of this type are described, for example, in French Patent Specification No. 1,188,495, German Patent Specification No. 1,247,646, or W. Noll, Chemie und Technologie der Silicone (Chemistry and Technology of Silicones), 1968, Verlag Chemie, Weinheim Chapter 8.1, particularly pages 341 and 342.

In the case of the known one-component systems, the adhesion to the most diverse substrates presents a problem which is not yet fully solved. In individual systems, this often leaves something to be desired, or substances have to be added, which otherwise again have an adverse effect on the system, be it that they impart a discoloration to the composition, that they are physiologically unacceptable, or that the crosslinking behavior or the stability to storage are disadvantageously changed.

It has now surprisingly been found that, by the addition of extremely active substances in small quantities, a very good adhesion is achieved, without adversely affecting the stability to storage, crosslinkability or the processability.

The present invention relates to organopolysiloxane molding compositions, which are capable of storage in the absence of moisture and which crosslink to give elastomers after the admission of water or steam, essentially consisting of (A) an α,ω-dihydroxyorganopolysiloxane of a viscosity of about 500 to 2,000,000 cP (20°)
(B) a substance which produces crosslinking
(C) reinforcing fillers and
(D) if appropriate, a hardening catalyst, which are characterized in that they additionally contain
(E) 0.1 to 15% by weight—relative to the total composition—of a silicon compound of the following general formula

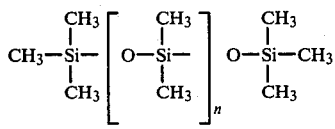

in which n represents a number from 0 to 9, with a viscosity of 0.65 to 4.5 cP.

In addition to the positive properties mentioned, these siloxanes surprisingly have no disagreeable accompanying phenomena, as known in many cases for other adhesion promoting substances, for example the elimination of substituents which are sensitive to hydrolysis, which can lead to a troublesome odor (in the case of amines) or to corrosion (in the case of acetic acid), or additives, such as, for example, titanium ester, which cloud a transparent composition.

These additives are further distinguished in that—for example in comparison with polymeric, resin-like additives—they are distillable and are therefore rigorously defined compounds with a reproducible spectrum of properties.

In general, especially the siloxanes in which n assumes values of from 0 to 5 are particularly suitable, and hexamethyldisiloxane is particularly preferably employed.

The additives according to the invention not only improve the adhesion of the system, but also effect, in general, a somewhat longer skinning time. This is very much desired in most areas of processing.

The additive is employed in quantities of 0.1–15% by weight, preferably 1–4% by weight, relative to the total quantity.

The cold-hardening one-component systems according to the invention customarily contain the following constituents:

1. An α,ω-dihydroxypolydiorganosiloxane; in this compound the organo group will normally be a methyl group or phenyl group. A halogenoalkyl group, such as, for example, a chloromethyl group, an alkenyl group, such as, for example, a vinyl group, or a cycloalkyl group, such as, for example, a cyclohexyl group, can also be present in relatively small proportions. The viscosity of the dihydroxypolydiorganosiloxanes is—according to the requirements of the end products—between about 500 and 2,000,000 cP (20° C.). Homopolymers, heteropolymers or even copolymers of this type make up, in general, about 10% by weight to 90% by weight of the total quantity of paste.

2. The crosslinking substance is a polyfunctional organosilicon compound with more than two functional groups. This substance must be able to "crosslink" the substances mentioned under 1.

In preparing the one-component rubber compositions according to the invention by mixing the various substances listed under A to E, the substances which serve as the crosslinking agent can be bonded to the polymer ends, by the splitting off of one of the reactive groups, either during the mixing process or during the storage process, or even in a form of pre-mixing.

Such organosilicon compounds can be:
(a) according to the formula

a=0 to 2

In this formula, R can be an alkyl, alkenyl, aryl or appropriately halogenated radical.

X is a reactive group which can react with a silanol group of constituent (1). The reactive group can, for example, be an alkoxy group, acyloxy group, amino group, cycloalkylamino group, acid amide group or oxime group.

(b) disiloxanes, trisiloxanes and polysiloxanes of the silanes listed under (a), formed by partial hydrolysis, as shown in the formula for the disiloxane

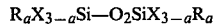

and prepared as (c) in DE-OS (German Published Specification) No. 1,794,197.

3. Fillers (charged or uncharged) of general type, used singly or, as in most cases, in a mixture, for example reinforcing fillers (highly disperse silicic acid prepared by flame-hydrolysis, titanium dioxide, carbon black, etc.) or fillers such as ground quartz, chalk (natural or precipitated), plastics in powder form and pigments of all types.

4. Auxiliaries of the most diverse type, such as, for example, those described under 2. having aminoalkyl, epoxyalkyl or other reactive alkyl groups, or also compounds as described under 2., in which a is 0 and various C atoms are located at a silicon atom.

(a) additives which are active, for example, as drying agents, such as, for example, complex titanium acid esters (see, for example, German Patent Specification No. 1,258,087).

(b) catalysts for accelerating the reaction silanol/-crosslinking agent or crosslinking agent-water, such as metal soaps of the metals from lead to manganese in the electrochemical series of metals, or amino compounds.

(c) solvent additives, such as, for example, toluene and petroleum ether.

(d) additives designated as softeners, such as, for example, an α,ω-trialkylsiloxypolydiorganosiloxane of 10 to 1,000,000 cP viscosity, polybutenes, benzine hydrocarbons or phosphoric acid esters.

(e) additives which improve the fungistatic activity of the sealing materials.

(f) additives which increase the physical properties of the sealing materials, such as, for example, the stability to hot air, thermal conductivity, electrical conductivity or stability to chemicals.

The preparation of the organopolysiloxane molding compositions is carried out in a manner which is in itself known—for example, as described in the publications mentioned hereinabove.

The examples which follow are intended to illustrate the present invention in more detail.

EXAMPLE 1

A mixture composed of 60 parts by weight of α,ω-dihydroxypolydimethylsiloxane, with a viscosity of 50,000 cSt at 20° C., and 20 parts by weight of α,ω-bis-(trimethylsiloxy)-polydimethylsiloxane, with a viscosity of 1,400 cSt at 20° C., is initially introduced into the reaction vessel. 4 parts by weight of ethyltriacetoxysilane and 2 parts by weight of hexamethyldisiloxane are added at room temperature and the mixture is stirred for a short time. 9 parts by weight of finely dispersed silicic acid are now added, and the mixture is stirred in vacuo until it is homogeneous. At the end of this process, 0.01 part by weight of a catalyst (dibutyl-tin diacetate) is added directly or in solution in a solvent (for example toluene or dioxane) and is stirred into the mixture in vacuo until the latter is homogeneous. The composition is now introduced into cartridges or tubes and can be stored, without admission of moisture, for at least ½ a year without the vulcanizability or the adhesion being adversely affected during later use.

The measure according to the invention results in a good adhesion of the product, without an undercoat, on aluminum, iron and anodized aluminum, and on plastics, such as, for example, on Plexiglas. A sealing material which was prepared without the addition of hexamethyldisiloxane had a substantially poorer adhesion on these substrates. The advantages in adhesion are of decisive importance particularly in the building sector, especially in window construction.

EXAMPLE 2

A mixture composed of 60 parts by weight of α,ω-dihydroxypolydimethylsiloxane and 20 parts by weight of α,ω-bis-trimethylsiloxypolydimethylsiloxane according to Example 1 is initially introduced into the reaction vessel. 4 parts by weight of methyltriacetoxysilane and 2 parts by weight of hexamethyldisiloxane are added at room temperature and the mixture is stirred for a short time. 9 parts by weight of finely dispersed silicic acid are added to the mixture, and the latter is stirred in vacuo until it is homogeneous. At the end of this process, 0.05 part by weight of a catalyst (dibutyl-tin diacetate) is added directly or in solution in a solvent (for example toluene or dioxane) and is stirred into the mixture in vacuo until the mixture is homogeneous. The composition is now introduced into cartridges or tubes, and can be stored, without admission of moisture, for at least ½ a year without the vulcanizability or the adhesion being adversely affected during later use.

The measure according to the invention resulted in a substantially better adhesion of the product, without an undercoat, on metals such as Al, Fe, anodized Al and plastics.

EXAMPLE 3

A mixture composed of 60 parts by weight of α,ω-dihydroxypolydimethylsiloxane and 20 parts by weight of α,ω-bis-trimethylsiloxypolydimethylsiloxane according to Example 1 is initially introduced into the reaction vessel. 3.5 parts by weight of vinyltriacetoxysilane and 2 parts by weight of hexamethyldisiloxane are added at room temperature and the mixture is stirred for a short time. 9 parts by weight of finely dispersed silicic acid are now added to the mixture, and the latter is stirred in vacuo until it is homogeneous. At the end of this process, 0.05 part by weight of a catalyst (dibutyl-tin diacetate) is added directly or in solution in a solvent (for example toluene or dioxane) and is stirred into the mixture in vacuo until the mixture is homogeneous. The composition is now introduced into cartridges or tubes and can be stored, without the admission of moisture, for at least ½ a year without the vulcanizability or the adhesion being adversely affected during later use.

With this additive, a good adhesion was achieved according to the invention, likewise without an undercoat, on the most diverse metals, such as iron, aluminum and anodized Al. The advantage of the relatively long open time also occurred in this case.

EXAMPLE 4

A mixture composed of 45 parts by weight of α,ω-dihydroxypolydimethylsiloxane and 22.5 parts by weight of α,ω-bis-trimethylsiloxypolydimethyl-siloxane according to Example 1 is initially introduce into the reaction vessel. 4 parts by weight of di-N-methylbenzamide-ethoxysilane and 0.5 part by weight of hexamethyldisiloxane are added at room temperature, and the mixture is stirred for a short time. 20 parts by weight of chalk, 5 parts by weight of finely dispersed silicic acid and 3 parts by weight of a color paste are now added to the mixture, and the latter is stirred in vacuo until it is homogeneous. At the end of this process, 0.03 part by weight of a catalyst (dibutyl-tin diacetate) is added directly or in solution in a solvent (for example toluene or dioxane) and is stirred into the mixture in vacuo until the mixture is homogeneous. The composition is now introduced into cartridges or tubes and can be stored, without admission of moisture, for at least ½ a year without the vulcanizability or the adhesion being adversely affected during later use.

The great significance of the additive with respect to the adhesion is also apparent in this example. A good adhesion result was also achieved in this case without an undercoat and with treatment with water, on aluminum, anodized Al, steel, iron, zinc, copper, concrete, PVC and polycarbonate.

EXAMPLE 5

A mixture composed of 58 parts by weight of α,ω-dihydroxypolydimethylsiloxane and 20 parts by weight of α,ω-bis-trimethylsiloxypolydimethylsiloxane according to Example 1 is initially introduced into the reaction vessel. 6 parts by weight of N,N-bis-triethoxysilylmethylallylamine and 1 part by weight of hexamethyldisiloxane are added at room temperature, and the mixture is stirred for a short time. 13 parts by weight of finely dispersed silicic acid are now added and the mixture is stirred in vacuo until it is homogeneous. At the end of this process, the composition is introduced into cartridges or tubes and can be stored, without admission of moisture, for at least ½ a year without the vulcanizability or the adhesion being adversely affected during later use.

A composition treated in this manner adheres without an undercoat, even after storage in water, on the following substrates: anodized Al, aluminum, iron and polycarbonate. A substantially improved adhesion on steel and zinc was also achieved. A lowering of the mechanical properties was also achieved in this example, having an advantageous effect on the adhesion (oblique stress).

EXAMPLE 6

A mixture composed of 60 parts by weight of α,ω-dihydroxypolydimethylsiloxane and 20 parts by weight of α,ω-bis-trimethylsiloxypolydimethylsiloxane according to Example 1 is initially introduced into the reaction vessel. 6 parts by weight of methyltributanoneoximesilane and 1 part by weight of hexamethyldisiloxane are added to the mixture at room temperature and the latter is stirred for a short time. 9 parts by weight of finely dispersed silicic acid are now added and the mixture is stirred in vacuo until it is homogeneous. At the end of this process, 0.1 part by weight of a catalyst (dibutyl-tin dilaurate) is added directly or in solution in a solvent (for example toluene or dioxane) and is stirred into the mixture in vacuo until the mixture is homogeneous. The composition is now introduced into cartridges or tubes and can be stored, without admission of moisture, for at least ½ a year without the vulcanizability or the adhesion being adversely affected during later use.

The measure according to the invention resulted in a good adhesion of this sealing material, without an undercoat, on aluminum, zinc, PVC and concrete, even after being exposed to water.

EXAMPLE 7

A mixture composed of 60 parts by weight of α,ω-dihydroxypolydimethylsiloxane and 25 parts by weight of α,ω-bis-trimethylsiloxypolydimethylsiloxane according to Example 1 is initially introduced into the reaction vessel. 4 parts by weight of methylethoxydipropionamidosilane and 1 part by weight of hexamethyldisiloxane are added at room temperature and the mixture is stirred for a short time. 8 parts by weight of finely dispersed silicic acid are now added and are stirred into the mixture in vacuo until the mixture is homogeneous. At the end of this process 0,4 parts by weight of a catalyst (DRTA) is added directly or in solution in a solvent (for example toluene or dioxane) and is stirred into the mixture in vacuo. The composition is now introduced into cartridges or tubes and can be stored, without admission of moisture, for at least ½ a year without the vulcanizability or the adhesion being adversely affected during later use.

A good adhesion, without an undercoat, on anodized Al, aluminum, iron and PVC, even after storage in water, could also be achieved in this example. A further improvement in adhesion was achieved on concrete and wood. Another advantage is the neutrality of odor of the paste, as well as its softness, which is of great advantage with respect to the adhesion in construction engineering.

EXAMPLE 8

A mixture composed of 60 parts by weight of α,ω-dihydroxypolydimethylsiloxane and 20 parts by weight of α,ω-bis-trimethylsiloxypolydimethylsiloxane according to Example 1 is initially introduced into the reaction vessel. 5 parts by weight of methylpropoxydicaprolactamsilane and 0.25 part by weight of hexamethyldisiloxane are added to the mixture at room temperature and the mixture is stirred for a short time. 7 parts by weight of finely dispersed silicic acid are now added and the mixture is stirred in vacuo until it is homogeneous. At the end of this process, 0.1 part by weight of a catalyst (dibutyl-tin diacetate) is added directly or in solution in a solvent (for example toluene or dioxane) and is stirred into the mixture in vacuo.

Finally, the composition is introduced into cartridges or tubes, and can be stored, without admission of moisture, for at least ½ a year without the vulcanizability or the adhesion being adversely affected during later use.

The measure according to the invention resulted in a substantial improvement in adhesion for the product, without an undercoat, in comparison to a product without this additive, on a number of metals (aluminum, copper and steel), plastics (various types of PVC) and on concrete, even after storage in water for one week.

It will be appreciated that the instant specification and examples are set forth by way of illustration and not limitation, and that various modifications and changes may be made without departing from the spirit and scope of the present invention.

We claim:

1. In a one component organopolysiloxane molding composition, which in the presence of water or steam crosslinks to give elastomers, comprising
    (A) an α,ω-dihydroxyorganopolysiloxane of a viscosity of about 500 to 2,000,000 cP (20° C.)
    (B) a crosslinking agent,
    (C) a filler, pigment and/or conventional auxiliary, and
    (D) optionally a hardening catalyst,
    (E) the improvement which comprises about 0.1 to 15% by weight of the total composition of hexamethyldisiloxane
whereby the composition is capable of prolonged storage in the absence of moisture without loss of properties.

2. A composition according to claim 1, wherein (E) is present in about 1 to 4% by weight.

3. A composition according to claim 1, wherein the crosslinking agent comprises ethyl-triacetoxysilane.

4. A composition according to claim 1, wherein the crosslinking agent comprises ethyl-triacetoxysilane, and (E) comprises hexamethyldisiloxane and is present in about 1 to 4% by weight.

* * * * *